July 24, 1962

A. R. BECHTEL, JR 3,045,809

COVER PLATE FOR FLAT WIRE CONVEYOR BELT

Filed July 7, 1959

INVENTOR.
ALFRED R. BECHTEL, JR.
BY
*Barlow & Barlow*
ATTORNEYS

United States Patent Office 3,045,809
Patented July 24, 1962

3,045,809
COVER PLATE FOR FLAT WIRE
CONVEYOR BELT
Alfred R. Bechtel, Jr., Portsmouth, R.I., assignor to Ashworth Bros. Inc., a corporation of Massachusetts
Filed July 7, 1959, Ser. No. 825,495
1 Claim. (Cl. 198—195)

This invention relates to improvements in flat wire conveyor belts in general and particularly the cover plates therefor.

Conveyor belts in the form of flat wire links which are joined together by a number of pintle rods have been known in the art for some time, one early example of such a belt being shown in U.S. Patent No. 1,354,553. This patent also discloses the use of cover plate constructions in general for such a belt and shows a cover plate being attached to the belt proper by means associated with pintle rods. It is obvious that as the conveyor is passed over driving pulleys and guide pulleys and the like that the pintle rods will become subject to various stresses, and therefore, this method of fastening the cover plate to such a belt is not entirely satisfactory.

It is accordingly an object of the present invention to provide an improved cover plate for a flat wire conveyor belt which is more firmly attached to the conveyor belt proper.

A further object of the invention is to provide an improved conveyor belt cover plate which will have portions thereof extending into the space between the alternate portions of the link in the flat wire conveyor belt so that the cover will encompass substantially the whole area, and thus provide an even surface for the material that may be carried thereon.

Another object of the invention is to provide an attachment means for a cover plate used in a flat wire conveyor belt that can be replaced with a minimum effort on the part of a mechanic.

With these and other objects in view, the invention consists of certain novel features of construction as will be more fully described and particularly pointed out in the appended claim.

Figure 1:
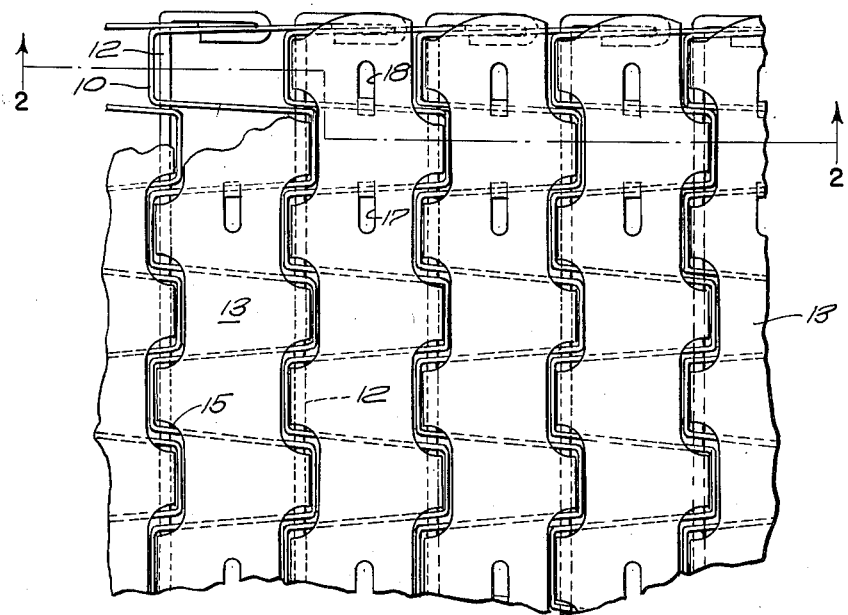
FIGURE 1 is a fragmentary top plan view of a flat wire conveyor belt which is equipped with cover plates embodying features of the present invention.
Figure 2:
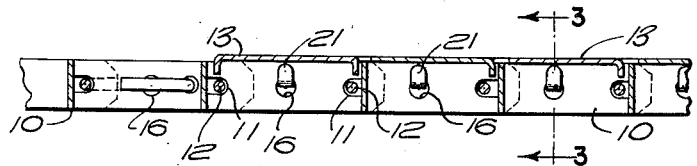
FIGURE 2 is a sectional view taken on lines 2—2 of FIG. 1.
Figure 3:
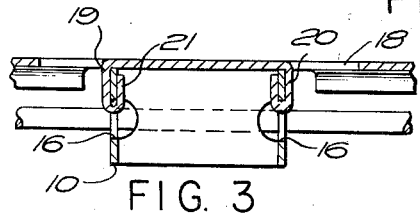
FIGURE 3 is a fragmentary sectional view taken on the plane shown by line 3—3 in FIG. 2.

Referring now to the drawings, 10 designates one link of the conveyor belt which, as will be seen in the drawing, is made from flat wire and consists of reversely bent portions providing a generally wavy undulating form which extend widthwise of the belt, thus providing spaced crests and recesses along both leading and trailing edges of the links with the crests in one edge entering the recesses in the edge of the next link. The leading and trailing edges of the flat wire links are suitably pierced as at 11 and receive therein pintle rods 12 which hingedly join the links together in the usual fashion. As will be understood to those skilled in the art, the belt may be driven from drums or pulleys or have a sprocket drive.

In many applications it is convenient to have cover plates on such a belt where relatively small objects must be carried thereon. To this end, there is provided a cover plate 13 which may be formed from sheet metal or any other suitable material, the plate having a substantially flat central portion with a plurality of tabs 15 extending from opposite edges thereof. The tabs 15 as will be seen in referring to FIGURE 1 extend into the reversely bent portion of the flat wire link and overlie when assembled the pintle rods 12. This construction then covers an area beyond the central flat portion of the cover plate and yet allows complete flexibility of the assembled belt in either direction. Actually, the cover plate of this construction completely fills the area defined by each individual link of the belt when the item is assembled as illustrated in FIG. 1.

To attach the plates to the flat wire belt, the central portion of each of the links is pierced as at 16 and the central portion of the plate 13 has two cut-outs such as 17 and 18 from which fingers 19 and 20 are formed. The fingers 19 and 20 may be suitably spaced throughout the extent of the cover plate 13 and in the present instance are shown as grasping every third reversely bent portion of the flat wire link. Other spacings of course are possible and the herein shown spacing is purely exemplary. The fingers 19 and 20 pass through the apertures 16 in the flat wire belt link and may be reversely bent as at 21 to grasp the flat portion of the link. This arrangement provides positive connection between the cover plate and the link and forms a structure which is extremely simple to take apart for replacement of an individual cover plate, the operation being able to be performed by an unskilled person.

Figure 5:
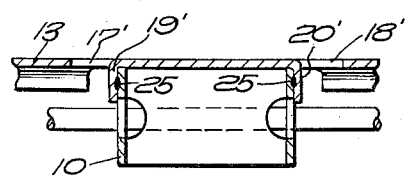
FIGURES 4 and 5 are alternate forms of fastening means taken in the position similar to that of FIG. 3.
Figure 4:
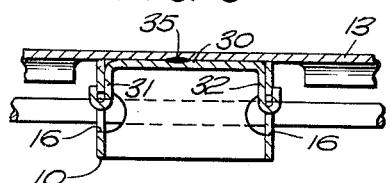
Figure 6:
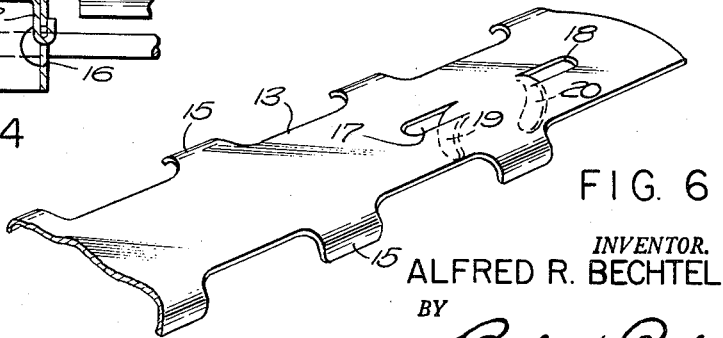
FIGURE 6 is a fragmentary perspective view of the cover plates of FIGS. 1-3.

For some purposes it may be desirable to have a completely flat central portion of the cover plate 13 that is a cover plate in which there are no cut-outs such as 17 and 18. To this end, the fastening may be altered by the utilization of a U-shaped staple 30 which has depending fingers 31 and 32. This U-shaped staple 30 may be spot-welded as at 35 to the underside of the cover plate 13. The number of staples 30 may be similar to the number of projecting fingers in the previous embodiment, and as in the previous embodiment, each of the fingers 31 and 32 are reversely bent on themselves through the apertures 16 to form a grip on the flat portion of the conveyor belt link. Referring to FIGURE 5 a still alternate form is illustrated where the cut-outs 17' and 18' provide fingers 19' and 20' as in the first embodiment, but in this case instead of reversely bending the fingers 19', 20' through apertures such as 16 in the flat wire links, the fingers 19' and 20' may be spot welded to the links as at 25.

Thus, it is seen that the cover plates of the instant invention have a positive engagement with the flat wire conveyor belt links which engagement may be made either permanent or semi-permanent depending upon the application of the plate to the job. Further, it will be noted that the cover plates of the instant invention are relatively simple in construction and provide the feature of covering substantially the full area of the flat wire link belt without hindering the flexibility thereof.

I claim:

A conveyor belt comprising flat wire links, each of undulating form having leading and trailing edges with a plurality of crests at one edge and an equal plurality of recesses in the other edge and with the crests at one edge of the link extending into the recesses at the other edge of the next link, pintle rods connecting the leading edge of one link to the trailing end of the next link, each link having a plurality of apertures between its upper and lower edges intermediate said leading and trailing edges, a planar cover plate for each link comprising a substantially flat central portion extending widthwise of the belt from one edge to the opposite edge of each link and located substantially midway between its leading and trailing edge, flat tabs in the plane of the plate extending from the ends thereof at the locations of the crests of the link to cover said pintle rods and each of a shape to generally follow the shape of the crest and fingers on said plate passing through said apertures to hold each plate to its wire link.

References Cited in the file of this patent

UNITED STATES PATENTS

| | | |
|---|---|---|
| 523,012 | Sewrey | July 17, 1894 |
| 1,354,553 | Harter | Oct. 5, 1920 |
| 2,621,779 | Harter | Dec. 16, 1952 |

FOREIGN PATENTS

| | | |
|---|---|---|
| 107,044 | Great Britain | June 11, 1917 |
| 354,029 | Great Britain | Aug. 16, 1931 |